United States Patent Office 3,468,831
Patented Sept. 23, 1969

3,468,831
GRAFT COPOLYMERS
Eugene S. Barabas, Watchung, and Marvin M. Fein, Westfield, N.J., assignors to GAF Corporation, New York, N.Y., a corporation of Delaware
No Drawing. Filed Nov. 15, 1966, Ser. No. 594,392
Int. Cl. C08f 21/00, 43/00
U.S. Cl. 260—29.6                            4 Claims

ABSTRACT OF THE DISCLOSURE

Water soluble graft copolymers are prepared by polymerization of a polymeric N-vinyl lactam, such as poly (N-vinyl pyrrolidone) with a fluorinated alpha, beta-unsaturated ester, such as fluorinated esters of acrylic or methacrylic acid.

---

This invention relates to graft copolymers and more particularly to graft copolymers of fluorinated esters of alpha, beta-unsaturated acids and N-vinyl lactams.

Grafted polymers comprising a basic homopolymer chain having grafted thereon units, or a plurality of units, of one or more polymerizable monomers in chain form, represent an interesting and important development in the resin arts particularly since such grafted polymers find immediate and practical utility for the resin chemist to utilize them as "building block" resin systems or "module" resin systems which can be employed to "tailor make" subsequent resin systems to suit specific industrial needs. Of such copolymers known in the art, grafted copolymers of N-vinyl lactams in general, and polyvinyl pyrrolidone in particular, have been projected into a position of prominence for use in pharmaceutical, cosmetic, textile and lithographic applications by reason of their excellent water solubility.

While various graft copolymers of these N-vinyl lactams are known in the prior art, none are known which include fluorinated esters of alpha, beta-unsaturated acids as monomers for copolymerization with the N-vinyl lactams.

It is accordingly one object of the present invention to provide novel graft copolymers comprising N-vinyl lactams and fluorinated esters of alpha, beta-unsaturated acids which are useful as intermediates in forming various novel resin systems.

A further object of the present invention resides in the provision of processes for the production of novel graft copolymers comprising N-vinyl lactams and fluorinated esters of alpha, beta-unsaturated acids.

A still further object of the present invention resides in the provision of novel graft copolymers of N-vinyl lactams and fluorinated esters of alpha, beta-unsaturated acids which are water-soluble and are produced in an aqueous reaction system.

An even further object of the present invention resides in the provision of novel graft copolymers wherein polymerized N-vinyl lactam units comprise the primary polymeric chain with units of fluorinated esters of alpha, beta-unsaturated acids attached thereto forming a water-soluble copolymer.

Still other objects and advantages of the invention will become apparent as the description thereof proceeds.

These and other objects and advantages are attained according to the present invention by the provision of novel graft copolymers comprising the copolymerization product of a polymerized N-vinyl lactam and a fluorinated ester of an alpha, beta-unsaturated acid. Also provided by the present invention is a process for producing said graft copolymers comprising subjecting a mixture of polymerized N-vinyl lactams and a fluorinated ester of an alpha, beta-unsaturated acid to polymerization at an elevated temperature and in the presence of a polymerization initiator.

According to the method of the invention as more fully delineated herein, novel graft copolymers of polymeric N-vinyl lactams and fluorinated esters of alpha, beta-unsaturated acids are produced under mild conditions of polymerization in good yields.

The polymeric N-vinyl lactams employed as primary reactants in forming the graft copolymers of this invention may be represented as having repeating units of the following formula:

I.

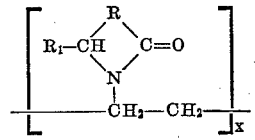

wherein R represents a divalent alkylene radical or bridge group having sufficient carbon atoms to form a 5, 6 or 7 membered heterocyclic rings system, $R_1$ is a member selected from the group consisting of hydrogen, alkyl, aryl, alkaryl, aralkyl, etc., preferably hydrogen, and X is an integer representing the extent of polymerization. The preferred reactant falling within the above formula is polyvinyl pyrrolidone, a material well known in the art as are the other N-vinyl lactams covered by Formula I.

All the specific polymeric materials characterized by the foregoing general formula are commercially available and are called polymeric (N-vinyl lactams). They are obtained by polymerizing organic 5, 6 or 7 membered ring compounds containing in their rings the

—NH—CO— group, such as, for example, 1-vinyl-2-pyrrolidone, 1-vinyl-5-methyl-2-pyrrolidone, 1-vinyl-2-piperidone, N-vinyl-ε-caprolactam, and the like. Depending upon the extent of polymerization, these polymers have molecular weights ranging from about 400 to up to 2,000,000 or more. The polymeric starting materials are characterized by a chain of carbon atoms to which the lactam rings are attached through their nitrogen atoms as follows:

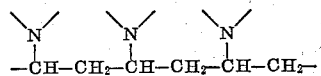

The number of recurring polymer units enclosed by brackets in the foregoing general structural Formula I, indicated by "X," or the extent of degree of polymerization corresponds to a chain of roughly 4 to 20,000 monomer units or more. In actual practice, a mixture of polymeric molecules, each containing a different number "X" of monomer units, is always produced.

The fluorinated esters of alpha, beta-unsaturated acids which are the monomers subjected to copolymerization with the above defined polymeric N-vinyl lactams may be represented by the following general structural formula:

II. 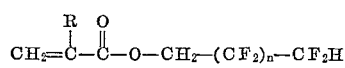

wherein R is hydrogen or an alkyl radical and $n$ is an integer. Preferred fluorinated esters of alpha, beta-unsaturated acids are those wherein $n$ has a value of one to about 13 and R is hydrogen or methyl thus representing the class of materials known as fluorinated esters of acrylic acid and methacrylic acid.

These materials are produced by the reaction of an alcohol and a fluorinated hydrocarbon such as for example methanol and tetrafluoroethylene. The resulting fluorinated alcohols may be represented by the following formula:

III 

wherein $n$ represents the values given above. The fluorinated alcohol is then reacted with the desired unsaturated acid to form the starting materials described by Formula II above.

A particularly preferred group of fluorinated alcohols and resulting esters are those wherein $n$ is an odd-numbered integer as these are the intermediates resulting from the reaction of methanol with a fluorinated hydrocarbon such as tetrafluoroethylene, which material is subsequently reacted with the unsaturated acid to form the desired fluorinated strating materials.

While not desiring to be bound by any particular theory or mechanism of reaction, it is believed that the arrangement of the respective monomeric units in the final product is an important feature of the invention. With respect to the copolymers of the present invention, it is believed that the units of the fluorinated esters are not situated in the main polymer chain but rather form a side chain on the preformed polymeric N-vinyl lactam, such as polyvinylpyrrolidone, which forms the skeletal chain for addition of the fluorinated alpha, beta-unsaturated esters.

The novel graft copolymers of this invention can be readily and conveniently prepared by subjecting a suitable mixture of the desired poly (N-vinyl lactam) and the fluorinated alpha, beta-unsaturated ester to polymerization conditions whereby vinyl-type polymerization occurs through the ethylenically unsaturated groups. Such means of vinyl-type polymerizations are well known in the art and include inducing means for initiating polymerization such as the use of high energy radiation, including gamma radiation, X-rays and the like or by the use of a free-radical type initiator, such as a free-radical producing redox-system.

The novel copolymers produced by this invention are high molecular weight graft copolymers which are completely soluble in water. Being water soluble, the products find great application as cast films wherein films are applied to surfaces. These films may be employed in coating textiles, in cosmetics and various other areas. For example, the graft copolymers produced by the invention may be employed as anti-snag finishes for hosiery and as film-forming adhesives and finishes. Also, they are particularly adapted as sizings for glass cloth and fibres as well as adhesives. Moreover, they may be employed as adhesive base materials for paper, cellophane, cloth, leather, cork, wood, ceramics, metals and some plastics. Hence, the products of the invention are of great utility over a wide area.

For the preparation of the graft copolymers of the invention, the fluorinated monomers are introduced into the reaction system along with the polymeric N-vinyl lactam, such as for example poly (N-vinyl pyrrolidone). It is preferred to carry out the reaction by dissolving or dispersing the reactants in an aqueous solution in the desired concentrations in the presence of a catalyst for initiation of polymerization. In addition to free-radical producing redox systems, other initiators can be employed including per-compounds such as organic and inorganic peroxides, for example, benzoyl peroxide, cumene hydroperoxide, hydrogen peroxide, acetyl peroxide, lauroyl peroxide, or persulfates such as alkali metal persulfates, including sodium and potassium persulfates, ammonium perborates, as well as azo-bis-nitriles such as azo-bis-isobutyronitrile. If desired, mixtures of initiators can be employed.

The initiator concentration employed in the reaction system is not necessarily a critical feature of the invention and thus can be varied over a wide range. Advantageously, however, an amount of catalyst of from about 0.01 to 2.0 weight percent or more can be employed based on the total weight of reactants being polymerized.

The ratios of each of the above primary reactants employed in the process may be varied over a wide range in order to obtain copolymer products of varied properties. Thus the polyvinyl lactam and fluorinated alpha, beta-unsaturated esters may be employed from about stoichiometric amounts to an excess of either.

An important aspect of the process employed to produce the water-soluble graft copolymers of this invention is that the reaction is carried out in an aqueous system, an advantage which serves to permit relatively easy and simple recovery of the grafted copolymer product already contained in a water solution for immediate use as desired.

The temperature at which the reaction is advantageously carried out can be varied over a range of about 50° C. and lower to about 95° C. and higher. However, it is preferred to conduct the polymerization at about 65° C. to 75° C. to avoid an unduly violent reaction and yet achieve sufficient reaction.

The reaction is normally conducted in a reaction vessel under a blanket of an inert gas, such as nitrogen, argon and the like, and is preferably carried out at atmospheric pressure. Additionally, the polymerization is to be conducted in the essential absence of free oxygen in order to provide optimum conditions for the graft polymerization reaction.

If desired, an activating agent, such as an alkali metal sulfite or bisulfite, e.g., sodium, potassium, etc., can be added to the polymerization reaction mixture in about the same amount as the polymerization catalyst in which case lower polymerization temperatures may be used. Additionally, chain regulators such as hexyl, cetyl, dodecyl, myristyl, etc., mercaptans can be employed in the reactions. Furthermore, suitable surface active agents may be added to the mixture in order to facilitate solubilization of the fluorine-containing ester. These include fluorinated fatty acids, fatty acid soaps, fatty alcohol sulfates such as sodium lauryl sulfate, potassium lauryl sulfate, etc., alkali metal salts of aromatic sulfonic acids, e.g., sodium isobutylnaphthalene sulfonate, etc., phosphate esters of polyethoxy alkylphenols, sulfosuccinic esters, etc.

The following examples will serve to illustrate the best mode of carrying out the reaction.

EXAMPLE I

Into a one liter reaction kettle equipped with a mechanical stirrer, reflux condenser, dropping funnel, gas inlet tube and thermometer were introduced the following ingredients at the periods and temperatures indicated in Table I while maintaining the reaction system under a blanket of nitrogen gas and at atmospheric pressure. As shown in the table, the reactants are charged to the flask at about 25° C., then heated at 100° C. for a short period and subsequently heated at 70° C. for the balance of the reaction.

TABLE I

| Ingredients | Amount Gms. | Amount Ml. | Initial charge, ml. | Ml. of ingredients added at Hours of Reaction 0 | ½ | 1 | 1½ | 2 | 2½ | 3½ | 4½ | 5½ |
|---|---|---|---|---|---|---|---|---|---|---|---|---|
| Water | 158.0 | [1] 104.7 | 100.7 | | | | | | | | 2.0 | 2.0 |
| Polyvinyl pyrrolidone/K-30 (Solid), gms | 50.0 | | 50.0 | | | | | | | | | |
| $CH_2=CHCOOCH_2(CF_2)_7CF_2H$ | 50.0 | 34.0 | | | | 12.0 | | 11.0 | | 11.0 | | |
| Gafac RE-610 | 5.0 | [2] 50.0 | 50.0 | | | | | | | | | |
| $(NH_4)_2S_2O_8$ | 0.26 | [2] 2.6 | | 2.6 | | | | | | | | |
| $(NH_4)_2S_2O_8$ | 0.06 | 6.0 | | | | | | | | 3.0 | 3.0 | |
| Temperature, °C | | | 25 | 100 | 70 | 70 | 70 | 70 | 70 | 70 | 70 | 70 |

[1] Amount of water used for making the solutions is deducted.
[2] Solution in water.

At the conclusion of the additions at the specified heating periods, the resulting reaction mixture was cooled to room temperature and the graft copolymer product solution recovered. The recovered product provided the following analysis:

Total solids, percent _____ 39.2
Residual monomer, percent _____ Nil
Conversion, percent _____ 100
K-value _____ 17.0
Brookfield viscosity (cps.) _____ 69.8

EXAMPLE II

In the same apparatus as described in Example I, the following materials were introduced under a nitrogen atmosphere at the periods and temperatures indicated in Table II. As shown in the table, the indicated reactants are initially charged to the reaction flask at 25° C. and the temperature is thereafter raised to 100° C. for a short period and subsequently lowered to 70° C. for the balance of the period.

TABLE II

| Ingredients | Amount Gms. | Amount Ml. | Initial charge, ml. | Ml. of ingredients added at Hours of Reaction 0 | ½ | 1 | 1½ | 2 | 2½ | 3½ | 4½ | 5½ |
|---|---|---|---|---|---|---|---|---|---|---|---|---|
| Water | 158.0 | [1] 104.7 | 100.7 | | | | | | | | 2.0 | 4.0 |
| Polyvinyl pyrrolidone/K-30, gms | 50.0 | | 50.0 | | | | | | | | | |
| $CH_2=CHOOCH_2(CF_2)_5CF_2H$ | 50.0 | 34.0 | | | | 12.0 | | 11.0 | | 11.0 | | |
| Gafac RE-610 | 5.0 | [2] 50.0 | 50.0 | | | | | | | | | |
| $(NH_4)_2S_2O_8$ | 0.26 | [2] 2.6 | | 2.6 | | | | | | | | |
| $(NH_4)_2S_2O_8$ | 0.06 | 6.0 | | | | | | | | 3.0 | 3.0 | |
| Temperature, °C | | | 25 | 100 | 70 | 70 | 70 | 70 | 70 | 70 | 70 | 70 |

[1] Amount of water used for making the solutions is deducted.
[2] Water solution.

At the conclusion of the reaction, the mixture was cooled to room temperature and the graft copolymer product solution recovered. The recovered product provided the following analysis:

Total solids, percent _____ 38.2
Residual monomer, percent _____ 1.98
Conversion, percent _____ 94.9
K-value _____ 17.7
Brookfield viscosity (cps.) _____ 60.0

In a similar manner, other polymeric N-vinyl lactams and fluorinated esters of alpha, beta-unsaturated acids of the classes described can be employed in place of the specific reactants described in these examples with similar results.

Reference in the specification and claims to parts, proportions and percentages, unless otherwise specified, refer to parts, proportions and percentages by weight.

It is obvious that numerous changes and modifications can be made in the above-described specific embodiments without departing from the spirit and nature of the invention. Therefore it is to be understood that all such changes and modifications are included within the scope of the invention and the invention is not to be considered as limited except as set forth in the appended claims.

What is claimed is:
1. A graft copolymer wherein the primary polymer chain is formed of a polymeric N-vinyl lactam corresponding to the following formula:

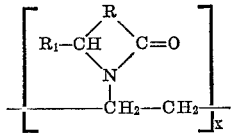

wherein R represents a divalent alkylene bridge having sufficient carbon atoms to form a 5, 6 or 7-membered heterocyclic ring system, $R_1$ is a member selected from the group consisting of hydrogen, alkyl, aryl, alkaryl and aralkyl and X is an integer representing the extent of the polymerization, said polymeric N-vinyl lactam having grafted thereon as side chains a fluorinated ester of an alpha, beta-unsaturated acid corresponding to the following formula:

$$CH_2=CH-\overset{R}{\underset{}{C}}-\overset{O}{\underset{}{\overset{\|}{C}}}-O-CH_2-(CF_2)_n-CF_2H$$

wherein R is selected from the group consisting of hydrogen and alkyl radicals and $n$ is an integer.

2. A graft copolymer according to claim 1 wherein the copolymer is contained in water solution.

3. A graft copolymer according to claim 1 wherein $n$ is an odd-numbered integer.

4. A graft copolymer according to claim 1 wherein the polymeric N-vinyl lactam is polyvinyl pyrrolidone.

References Cited

UNITED STATES PATENTS 3,068,187   12/1962   Bolstad et al.
3,244,658   4/1966   Grosser et al.

MURRAY TILLMAN, Primary Examiner

H. ROBERTS, Assistant Examiner

U.S. Cl. X.R.

260—884